April 1, 1969  F. R. ALLENDER  3,435,808
ROTARY ENGINE

Filed April 10, 1967

INVENTOR.
FORREST R. ALLENDER
BY
K.M. LE FEVER
ATTORNEY

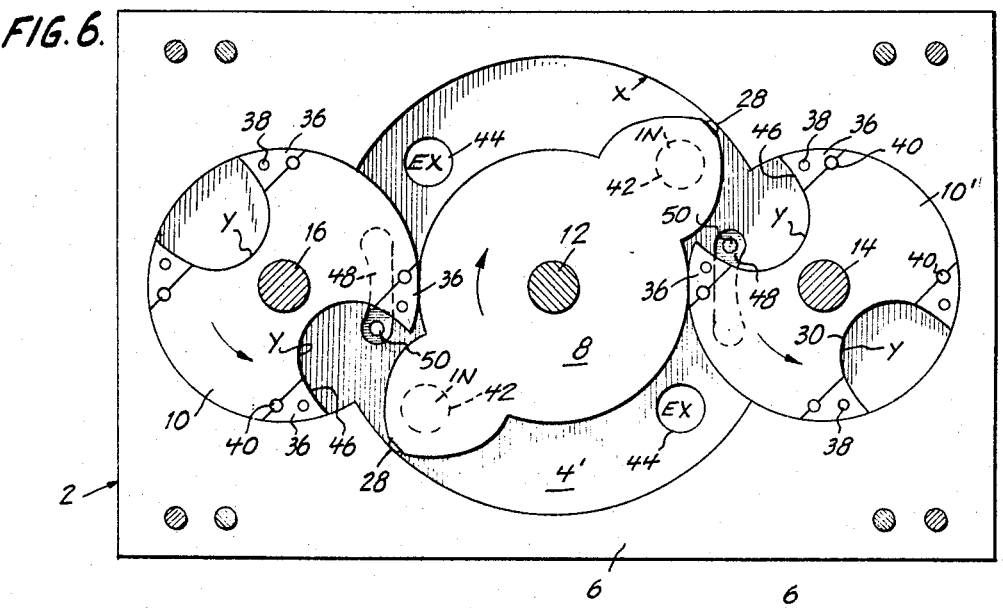
FIG. 6.
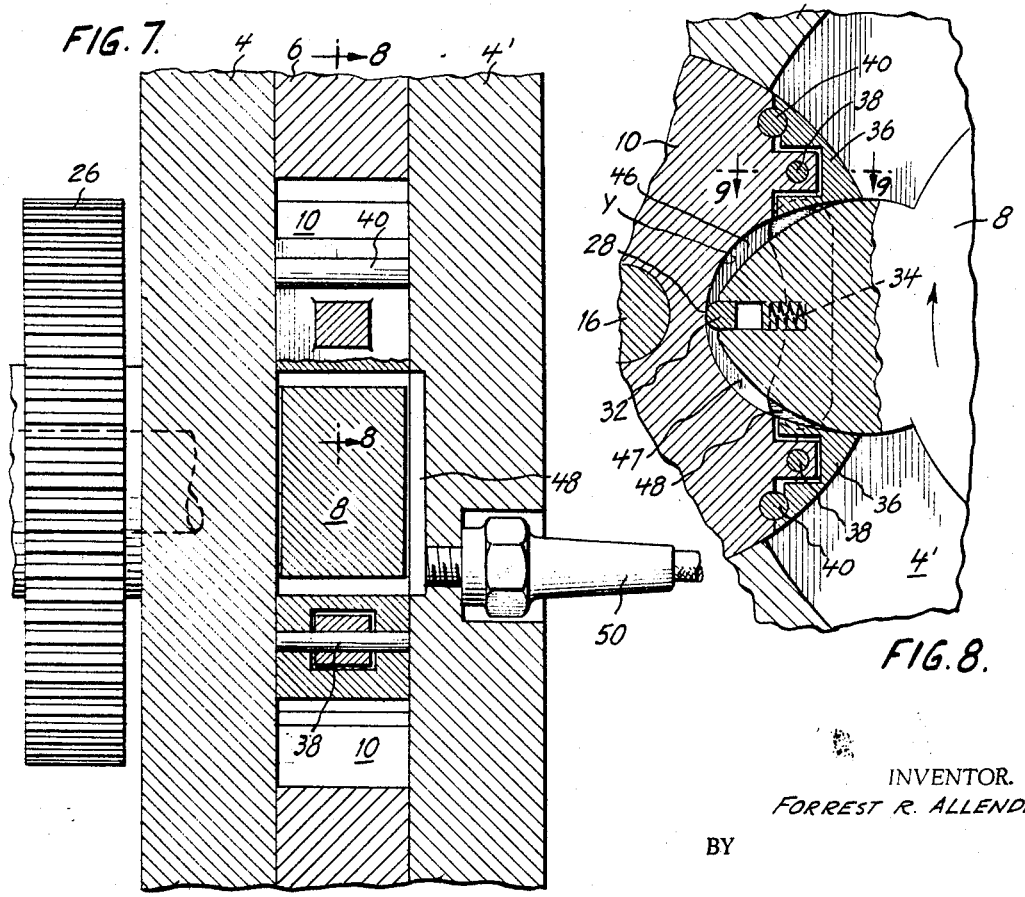
FIG. 7.
FIG. 8.
INVENTOR.
FORREST R. ALLENDER
BY
K. M. LE FEVER
ATTORNEY FIG. X.
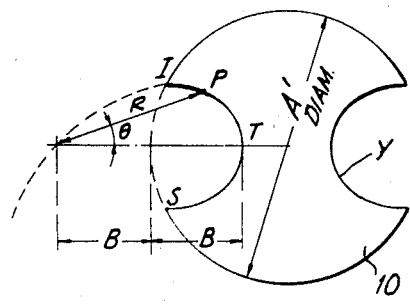
FIG. Y.
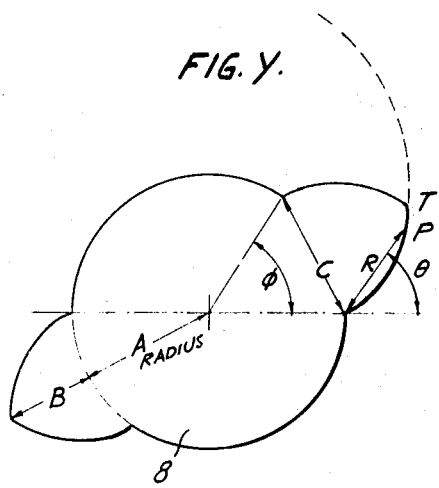
FIG. 10.
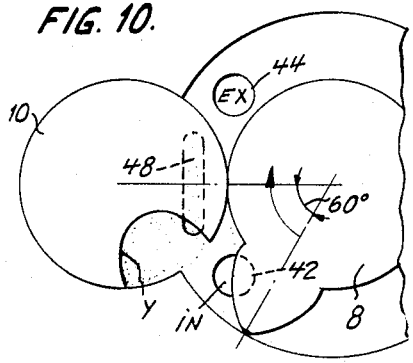
FIG. 11.
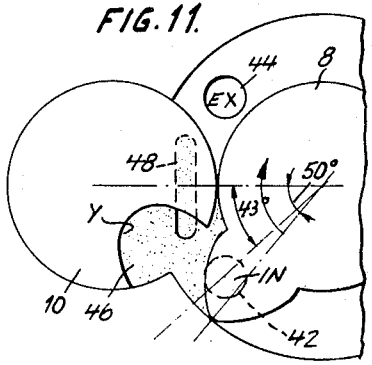
FIG. 12.
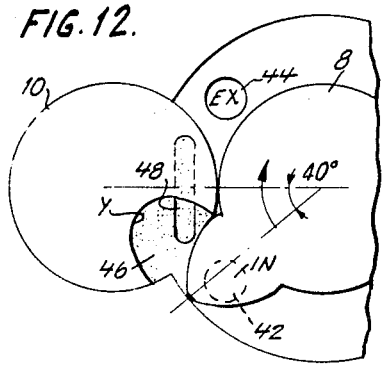
FIG. 13.
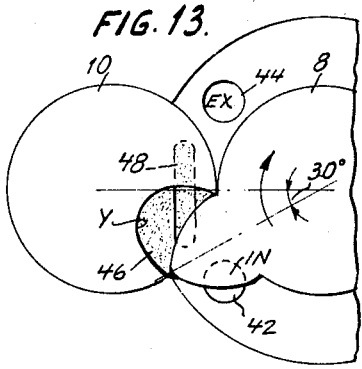
INVENTOR.
FORREST R. ALLENDER
BY
K.M. LeFEVER
ATTORNEY INVENTOR.
FORREST R. ALLENDER
BY
K. M. LeFEVER
ATTORNEY United States Patent Office 3,435,808
Patented Apr. 1, 1969

3,435,808
ROTARY ENGINE
Forrest R. Allender, South Bend, Ind., assignor to The Clayg Corporation, Elkhart, Ind., a corporation of Indiana
Continuation-in-part of application Ser. No. 435,641, Feb. 26, 1965. This application Apr. 10, 1967, Ser. No. 633,347
Int. Cl. F02b 53/06, 55/02
U.S. Cl. 123—13                12 Claims

ABSTRACT OF THE DISCLOSURE

A rotary internal combustion engine comprising a power wheel having two lobes projecting outwardly from diametrically opposed positions on the power wheel. A pair of compression chamber wheels are disposed on diametrically opposite sides of the power wheel. Each compression chamber wheel has two chambers provided therein and the lobes are movable through the chambers. The lobes and chambers are shaped so that a compression zone is formed between the tip of the lobe and the leading end of the chamber and a combustion zone is formed between the tip of the lobe and the trailing end of the chamber. Transfer passage means are provided for transferring compressed gas from the compression zone to the cobustion zone so that the gas can be ignited in the combustion zone.

---

This application is a continuation-in-part of my copending application Ser. No. 435,641, filed Feb. 26, 1965, now abandoned.

This invention relates to an internal combustion engine. Particularly the invention relates to a rotary internal combustion engine wherein the kinetic energy of expanding gases is utilized directly to give rotary motion.

Basically the engine of this invention comprises but three moving parts; a power disc, or wheel, flanked by two compression chamber discs, or wheels. The power wheel, so named since the power developed by the engine is taken from it, is equipped with two diametrically opposed power-compression lobes as integral parts thereof. The two compression chamber wheels flanking the power wheel are each equipped with two diametrically opposed compression recesses, or chambers, in the periphery thereof.

The power wheel and the compression chamber wheels are continuously geared to each other in the same plane so that they rotate at the same number of revolutions per minute, the power-compression lobes simultaneously passing through compression chambers of each of the two compression chamber wheels. As the power-compression lobes of the power wheel pass through the compression chambers they compress a gas, or fuel mixture, to a point of desired compression in a compression zone on the leading side of the power-compression lobe, the compressed fuel is transferred to a combustion zone on the trailing side of the power-compression lobe, the compressed fuel is ignited in the combustion zone, and the force of the ignited fuel in the form of the kinetic energy of expanding gases is exerted against the trailing side of power-compression lobes, thus imparting torque to the power shaft to which the power wheel is attached as an axle.

In the instant inventive concept, the power-compression lobes of the power wheel are generally tooth-like in shape having a chord portion and an apex. The lobes have leading and trailing sides which are generally epicycloid in shape, although the trailing side can at least in part be of other than exactly epicycloid shape as discussed hereinafter. The compression chambers are preferably limacon-shaped and are so designed to permit a power-compression lobe and a compression chamber to coact with two simultaneous points of contact during their coaction. Thus, the apex of the power-compression lobes makes sliding contact with the trailing side of the compression chamber at the outer extremity of the lobe at the same time as the leading side of the lobe contacts the outer extremity of the leading side of the compression chamber. These points of contact are line contact and form seals for a compression zone in which may be confined a gas, which may be a combustible fuel-air mixture. As the rotary motion continues, that is, as the power-compression lobe moves through the compression chamber, any gas in the compression zone is compressed. As the apex of the power-compression lobe reaches and passes the apex of the compression chamber, i.e., reaches and passes "top dead center," the compressed gas is transferred past the leading side of the power-compression lobe to a combustion zone sealed at two spaced positions by the line contact between the apex of the power lobe and the leading side of the compression chamber and the line contact between the trailing side of the lobe and trailing side of the compression chamber. This transfer is via transfer means which may, for example, be a groove or recess in the apex of the compression chamber or a groove or longitudinal recess formed in a side plate adjacent to the power wheel. When the leading side of the power-compression lobe eclipses the forward end of the transfer means, as shown in the drawings, the compressed gas is ignited and the expanding gases from the burning mixture exert a pressure against the trailing side of the power-compression lobe.

As the movement of the lobe continues through the power stroke, the kinetic energy of the expanding gases in the combustion zone is converted into rotary motion of the power wheel. At the desired point in the cycle, the trailing side of the power-compression lobe passes and opens an exhaust port and the burned gases are exhausted through the port. As the power-compression lobe continues motion, it compresses a fresh supply of gas introduced into the engine at a point ahead of the leading side of the power-compression lobe. This volume of gas is swept ahead of the leading side of the power-compression lobe into the compression chamber of the opposed compression chamber wheel, and the cycle is repeated.

It is to be seen by those familiar with the art, that in the design herein described, the application of the force of the expanding gases is continuously and smoothly applied substantially entirely to the trailing side of the power-compression lobe.

As was generally stated above, the rotary internal combustion engine of this invention comprises but three moving parts, a central power disc or wheel having diametrically opposed power-compression lobes as integral parts thereof, and two flanking compression chamber discs or wheels, each having a pair of compression chambers therein that are diametrically opposed. The three wheels are geared to each other so that they rotate in synchronized fixed relation, the central power wheel rotating in a clockwise direction in the disclosed embodiment, and the flanking compression chamber wheels rotating in a counterclockwise direction in the disclosed embodiment. The wheels can be rotated in the opposite direction, if desired. The three wheel members rotate in the same plane about axles which are secured in bearing means, such as ball or roller bearings inset in a pair of opposed side plates (heads) which are removably affixed to a center plate, or block member. The block member contains circular recesses to accommodate the rotation of the wheel members. Thus the side plates with the central recesses of the block member form a gas-tight chamber within which the wheel members rotate and perform their designed functions.

The diameters of the three wheel members are such that they rotate in fixed relation and, except for the period of coaction of the power-compression lobes with the compression chambers, make constant rolling substantial line contact with each other. The block member which separates, or is between, the two side plates, or head members, is slightly thicker than the wheel members so as to allow clearance for rotation of the wheel members but not sufficient clearance, when lubricated, to allow for escape of gas therebetween. It is also contemplated that annular matching grooves may be machined near the periphery of both sides of the wheel members and in the adjacent side plates to receive slideable seal means to seal compressed and combusting gas in the respective compression and combustion zones.

As will be more clearly explained hereinafter, the rotation of the wheel members within the gas chamber, formed by the side plates and the recess of the block member, first compress a combustible gas mixture and then are driven in a rotary motion by the kinetic energy of burning and expanding gases. The intake, compression, power, and exhaust cycles of this rotary engine are continuous and in one direction without the constant change of direction that is inherent in all forms of reciprocating engines.

An important feature of this invention is the shape of the power-compression lobes and the coacting compression chambers. The design of the lobes and the compression chambers is such that sealing means at the tip of the power lobe, and toe sealing means at the extremities of the compression chamber maintain constant sliding line contact at two places throughout the coaction between the lobes and chambers.

A preferred construction of the power lobes and compression chambers will now be described. The preferred construction makes posible constant, smooth and unchanging motion throughout the compression, transfer, ignition and combustion cycles. There is no loss of compression and the turbulence of the compressed gas mixture is increased during transfer, thus giving a higher, cleaner and more thorough combustion of gases, The use of the described formulas simplifies the manufacture of the parts and thus reduces costs, and they also make possible the holding of tolerances relatively easily and conveniently.

Referring to FIGURE X of the drawings, the compression chamber wheel can be described as a circle of diameter A' with two diametrically opposed cavities (compression chambers) which have their shapes determined by a curve called a "limacon."[1]

A mathematical description of one of these compression chambers (IPTS on FIGURE X) in polar coordinates is:

$$R = -A' + (A' + 2B) \cos \theta$$

where $\theta$ assumes values of from:

(1) $\quad +\text{arc cos} \left( \dfrac{B^2 + A'B + A'^2}{A'(A'+2B)} \right)$ to:

(2) $\quad -\text{arc cos} \left( \dfrac{B^2 + A'B + A'^2}{A'(A'+2B)} \right)$ where A'=the diameter of the compression chamber wheel, and
B=the depth of the compression chamber.

An opposing compression chamber can be described in this same way by simply rotating the compression wheel about its center through 180°.

As is shown in FIGURE Y of the drawings, the power-compression wheel may be described as a circle with diameter 2A with two diametrically opposed lobes which have their shape determined on each side by a curve called a "cardioid,"[2] a member of the family of epicycloids.

The mathematical description of one side of a power-compression lobe (OPT of FIGURE Y) in polar coordinates is:

$$R = 2A (1 - \cos \theta)$$

As $\theta$ assumes values from 0° to $$\text{Arc cos} \dfrac{(A+B)^2 - 5A^2}{-4A^2}$$

Each of the sides of the power-compression lobe can be described similarly when placed in proper position with respect to the axis. This position can be determined by knowing $$\phi = 2 \text{arc sin} \dfrac{\dfrac{B(2A+B)}{2A} \sqrt{1 - \left( \dfrac{(A+B)^2 - 5A^2}{-4A^2} \right)^2}}{A+B}$$

or $$C = 2A \dfrac{\dfrac{B(2A+B)}{2A} \sqrt{1 - \left( \dfrac{(A+B)^2 - 5A^2}{-4A^2} \right)^2}}{A+B}$$

where

A=the radius of the power wheel
B=the distance from the top of the lobe to the nearest edge of the circle
C=the length of the chord determined by the base of a lobe, and
$\phi$=the angle subtended by chord C.

It will be noted that the arrangement of the compression chambers and lobes is symmetrical which makes it possible to reverse the direction of rotation of the wheels by reversing the connection of the inlet and exhaust ports and changing the position of the ignition means as needed. However, if a reverse driving capability is not required, then the shape of the trailing side of the power lobe can be of modified shape because the required sealing effect thereof with the trailing side of the chamber occurs at a zone close to the base portion thereof. Thus, the portion of the trailing surface of power lobe outwardly of the sealing zone thereof can be provided with holes, cavities, etc. to provide control of the compression ratio and for other purposes.

It will be apparent to those skilled in the art, that the volumes of the gas to be compressed may be varied as desired by varying the thickness and the radii of the coacting wheels, and the location of the position of entry of the gas. It is also apparent that the relative dimensions of the wheels are fixed by the desired nature of their coaction. The number of power-compression lobes on the power wheel and the number of compression chambers coacting therewith are limited only by considerations of design. To come within the purview of this invention at least one lobe must coact with at least one compression chamber to provide a seal between the tip of the lobe and the wall of the compression chamber, which tip seal coacts with a seal between the leading sides of the lobe and compression chamber to form a sealed compression zone and which tip seal coacts with a seal between the trailing sides of the lobe and compression chamber to form a sealed combustion zone which is isolated from the compression zone. It will be understood that if the relative dimensions of the power and compression chamber wheels are varied the shape of the power lobe may vary.

The concept of the instant invention will be more clearly explained by referring to the following drawings.
In the drawings:

---

[1] See Mathematics Dictionary, p. 212, James and James, D. Van Nostrand Company, copyright 1949; to obtain the descriptive equation given herein from that on p. 212 of the Mathematics Dictionary, replace A and B of the equation on page 212 with $(A'+2B)$ and $A'$ respectively.

[2] See Mathematics Dictionary, p. 38, James and James, D. Van Nostrand Company, copyright 1949; to obtain the descriptive equation herein from the one given on p. 38 of the Mathematics Dictionary, replace A and $\phi$ of the equation on p. 38 with 2A and $\theta$ respectively.

FIGURE X is a schematic diagram to be used for deriving the equation describing a preferred shape of the compression chamber;

FIGURE Y is a schematic diagram to be used for deriving the equation describing a preferred shape of the power-compression lobe;

FIGURE 6 is a section taken along the line 5—5 of FIGURE 2 at a state of rotation that is 90° greater than that of FIGURE 5, that is, at a rotation of 135°;

FIGURE 7 is an enlarged cross-sectional view taken along the line 7—7 of FIGURE 4;

FIGURE 8 is a detailed view taken along the line 8—8 of FIGURE 7 with the three major moving components at 180° rotation, or at a position of "top dead center";

FIGURES 10–22 represent schematic diagrams showing the coaction of one power-compression lobe with one compression chamber through 120° of rotation.

Figure 1:
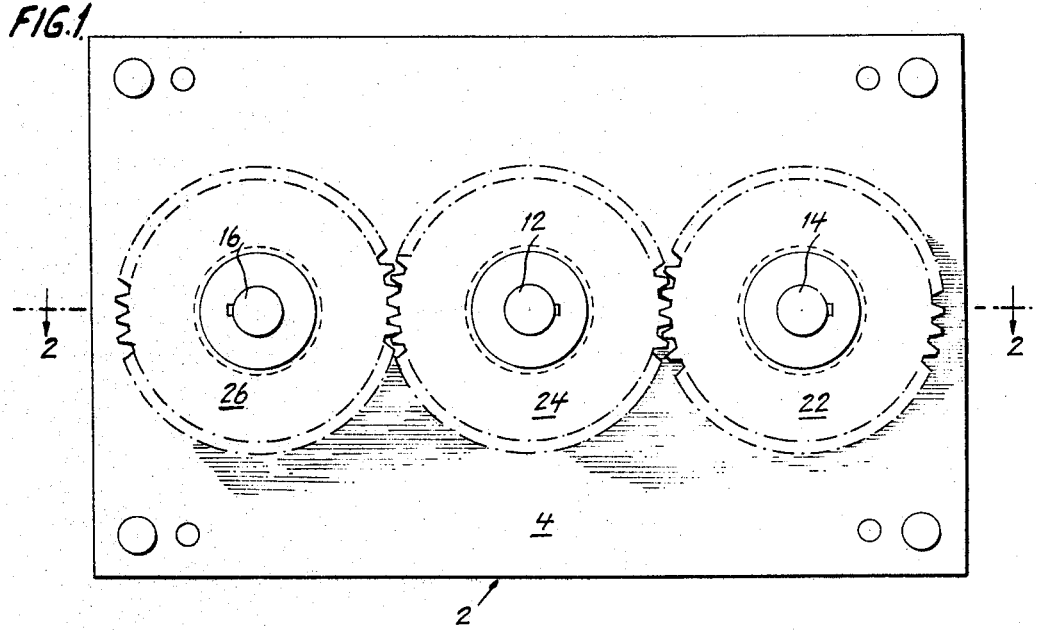
FIGURE 1 is a side view of the rotary internal combustion engine showing one embodiment of a synchronizing gearing means.
Figure 2:
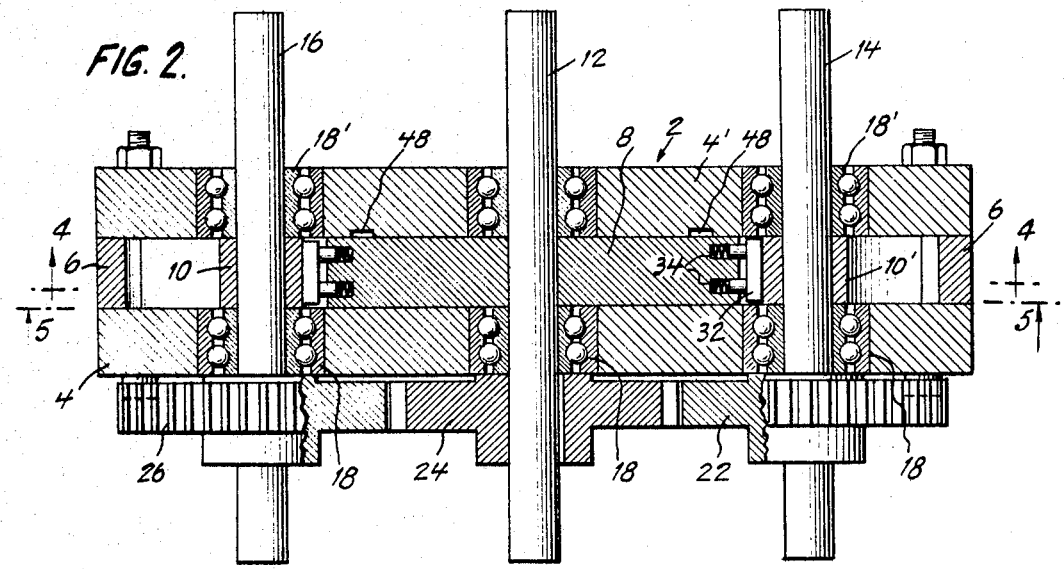
FIGURE 2 is a section of the engine taken along the line 2—2 of FIGURE 1.
Figure 9:
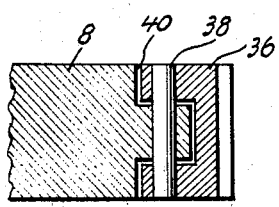
FIGURE 9 is a cross section of the toe sealing means taken along the line 9—9 of FIGURE 8.
Figure 4:
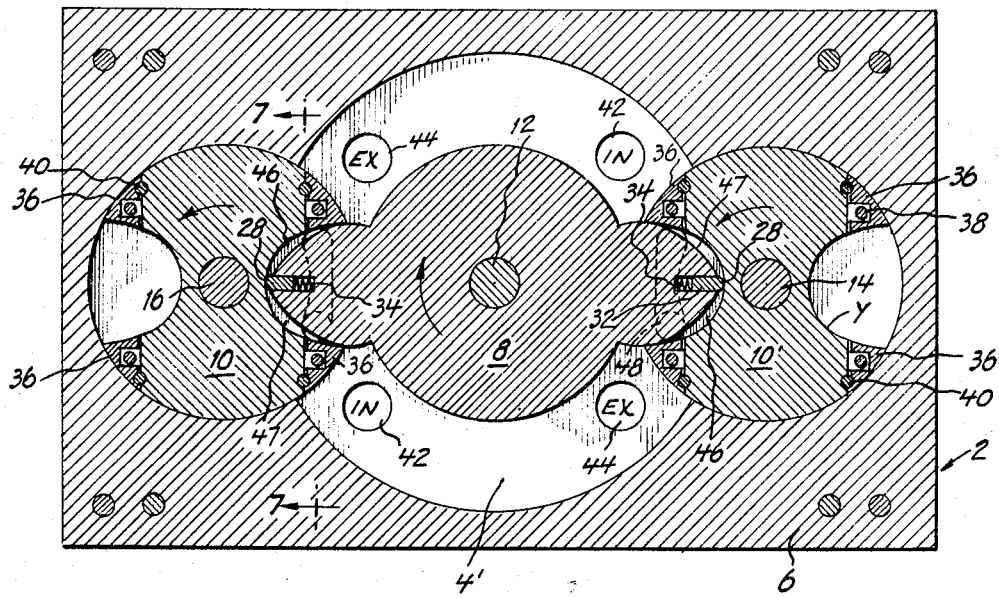
FIGURE 4 is a section of the engine taken along the line 4—4 of FIGURE 2 showing the three major moving components of the engine at 0° rotation, or at the position of "top dead center"

Turning now to the drawings, reference 2 generally indicates the rotary internal combustion engine of the instant invention. The engine comprises a pair of head members 4 and 4', and a block member 6. Rotatably mounted within block member 6 are the three major moving parts, power wheel 8 and compression chamber wheels 10 and 10' shown in FIGURES 4, 5 and 6. Power wheel 8 is permanently affixed against relative rotation to power take-off shaft 12, e.g., as by a shrink fit thereto, by splining, or by other means known to the art. Similarly, compression chamber wheels 10 and 10' are affixed to shafts 14 and 16. Shafts 12, 14 and 16 are suitably mounted in block members 4 and 4' by bearing means, either roller or ball bearing, illustrated with ball bearing members 18 and 18' in FIGURE 2. Shafts, 12, 14 and 16, and, therefore, power wheel 8 and compression chamber wheels 10 and 10', are caused to rotate in synchronized relation by suitable gearing means. Meshing teeth may be formed on the periphery of the power and the compression chamber wheels, for synchronization and/or sealing. Both external and internal gearing may be used if desired. However, it is preferred that the synchronization be accomplished by external gearing, as is illustrated by gears 22, 24 and 26 of FIGURES 1, 2 and 7.

Figure 5:
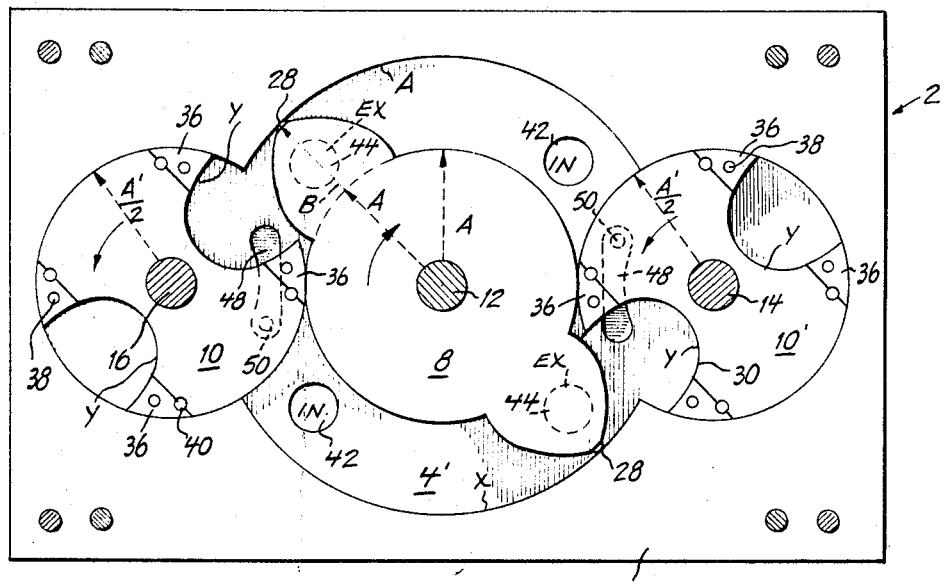
FIGURE 5 is a section taken along the line 5—5 of FIGURE 2 showing the three major moving components at a rotation of 45°.

Power wheel 8 and compression chamber wheels 10 and 10' have identical radii as is shown in FIGURE 5.

Block member 6 is recessed with three overlapping circles. The two outside circles have radii of A (or A'/2) and the center circle has a radius of A+B. Thus, when the two head members 4 and 4' are placed on each side of block member 6, there is formed a chamber. The sides of this chamber are flat and are formed by the head members 4 and 4'. The two compression chamber wheels 10 and 10' and the power wheel 8 rotate within this chamber in the manner illustrated in the drawings and in the direction indicated by the arrows.

The compression chamber wheels 10 and 10' contain diametrically opposed chambers therein, which chambers extend through the thickness of the wheels and which are limacon shaped, as previously described. The tip of power lobe 28, as shown in FIGURE 5, when it leaves a compression chamber of wheel 10', establishes line contact with the surface of arc X of the chamber in block 6 and maintains this contact until entering the compression chamber of wheel 10. The tip at that instant establishes and thereafter maintains line contact with the surface of arc Y of the compression chamber of wheel 10, until the tip leaves the chamber of wheel 10 and establishes line contact with the surface of arc A. The line contact is maintained throughout the revolution of the power wheel 8.

Fitted in the tip of each power lobe, as at 28, are diametrically opposed tip seals. These seals are more graphically described by reference to FIGURE 8. The tip sealing member 32 operates in a transverse recess, machined in power lobe 8, and is held in a slightly extended position by means of biasing spring 34, aided, when in motion, by centrifugal force. It will be understood that other sealing means may be used, as, for example, grooved ring-type sealing means or other means known to the art.

The outer extremities of the compression chambers in the compression chamber wheels are also equipped with sealing means referred to as toe seals and shown at 36 in the drawings, as in FIGURE 8. These toe seals comprise a member hinged to the compression chamber wheel at 38 and held at extended position so as to insure contact throughout the travel of the power lobe by resilient means, as shown at 40. This resilient means may be, for example, a silicone rubber dowel.

Intake ports, shown at 42, may be connected to carburetion means, not shown, for entry of gas, such as a combustible mixture. These intake ports may be positioned in side plate 4' as desired and their location controls the amount of gas introduced ahead of the power compression lobes. Exhaust ports, shown at 44, are located in side plate 4' and may be connected to muffling means, not shown, for the exhausting of burned gases therethrough.

The chamber formed by the overlapping circles of block member 6 and the sides of head members 4 and 4' correspond to the piston chamber (cylinder) of a reciprocating engine. With the rotation of the moving parts and with the proper placing of intake and exhaust orifices, a greater or lesser degree of compression may be attained as power wheel 8 rotates. Any combustible mixture is compressed into the small volume 46 ahead of the tip sealing means. Gas transfer means, such as the longitudinal recess 48, as shown in FIGURE 7, is provided for the transfer of compressed gas from volume 46 to volume 47, i.e., from ahead of the power-compression lobe to behind the lobe. Ignition means is provided, such as at 50, opening into longitudinal recess 48, to ignite the compressed gas. The kinetic energy of the expanding gases acting upon the trailing edge of the power-compression lobe force the power wheel in a clockwise direction. As illustrated in FIGURE 5, at 45° rotation, the opposite power-compression lobe is similarly being forced in a clockwise direction by expanding gases.

At the desired point in the cycle, the lobes of power wheel 8 clear exhaust ports 44 and the expanding gases are exhausted and a fresh charge of gas is introduced through intake port 42 and the cycle is repeated. It is thus seen that there are two complete intake, compression, power and exhaust phases with each 180° rotation of the power wheel.

Although one means of transfer of compressed gas from the compression zone to the combustion zone and the ignition means therefor has been described, it will be appreciated that other transfer and ignition means may be adopted without departing from the inventive concept.

Figure 3:
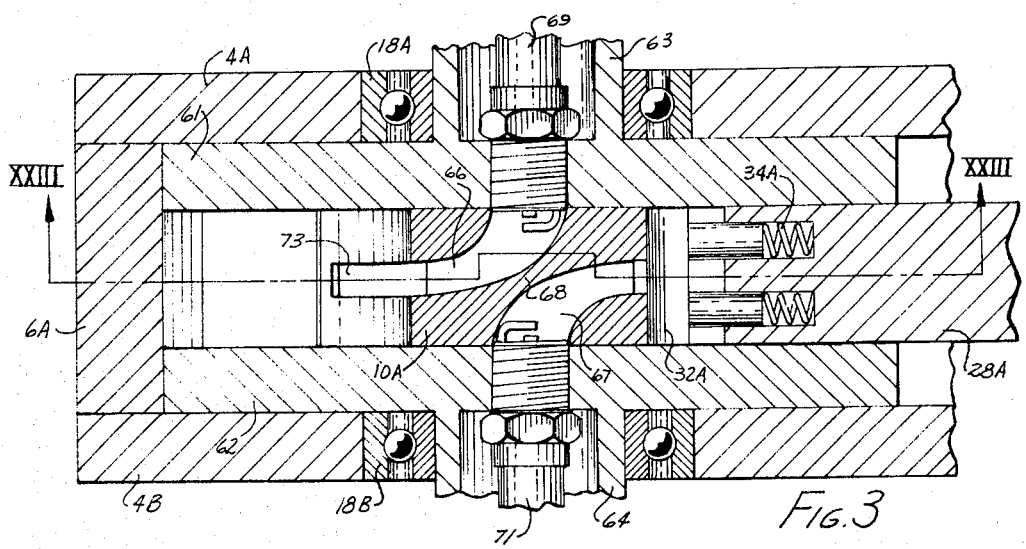
FIGURE 3 is a view corresponding to a fragment of FIGURE 2 and showing a modficaton.
Figure 23:
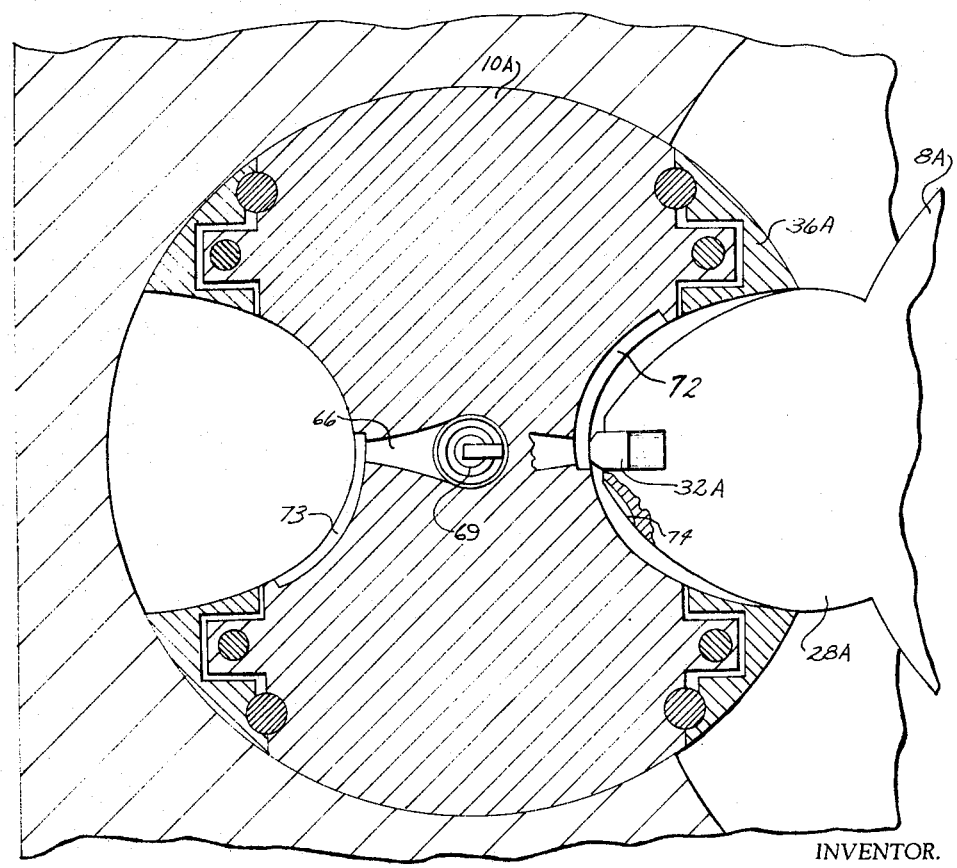
FIGURE 23 is a sectional view taken along the line XXIII—XXIII of FIGURE 3.

Referring to FIGURES 3 and 23, there is illustrated a fragment of an engine comprising a compression chamber wheel 10A and a fragment of the power wheel 8A including a power lobe 28A. Except as described below, the compression chamber wheel 10A and the power wheel 8A are constructed and arranged in the same fashion as the compression chamber wheel 10 and the power wheel 8 in the previously described embodiment and, hence, a detailed description thereof is believed to be unnecessary. Other parts of this embodiment which are the same as in the previously described embodiment are identified by the same reference numeral with the suffix A added thereto.

In this embodiment, the compression chamber wheel 10A has end plates 61 and 62 disposed on opposite axial sides of said compression chamber wheel and secured thereto in any suitable manner so that said end plates rotate with said compression chamber wheel. The end plates 61 and 62 close off the axial ends of the chambers in the compression chamber wheel. The end plates 61 and 62 have integral tubular extensions 63 and 64 which are rotatably supported by bearings 18A and 18B in the head members 4A and 4B. It will be understood that the tubular extension 63 and 64 correspond to the shaft 16 in the previously described embodiment of the invention.

The compression chamber wheel 10A has two arcuate passageways 66 and 67 formed therein. The outer portions of the passageways 66 and 67 extend substantially radially and open through the base wall of the chambers in the wheel 10A. The inner portions of the passageways curve in opposite directions through angles of about 90° so that the inner ends of said passageways extend axially in opposite directions. The passageways 66 and 67 are separated by a web 68.

Spark plugs 69 and 71 are threaded into coaxial openings in the end plates 61 and 62 and the electrodes thereof extend a slight distance into the inner ends of the passageways 66 and 67, respectively. Thus, the passageways 66 and 67 permit the spark to travel to the combustion chamber.

Transfer passages 72 and 73 are formed in the base walls of the chambers in the wheel 10A. The transfer passages extend from slightly below the center of the base wall of the chamber a substantial distance along the leading side of the chamber base wall so that the gas compressed in the compression chamber between the leading side of the lobe 28A and the leading side of the chamber base wall will be transferred to the combustion chamber between the trailing sides thereof beginning at about the time the power lobe reaches the top dead center position.

The spark plugs 69 and 71 will be fired alernately when the chamber with which they are associated is coacting with a power lobe. The exact time of firing will be determined by a suitable timing circuit. A small groove 74 can be machined into the power lobe 28A immediately below the tip seal 32A so that the gases flow more nearly tangent to the direction of rotation of the power lobe.

The use of the two spark plugs provides improved ignition control, and better cooling of the spark plugs and the combustion areas of the engine to provide better control over the operating temperature of the engine.

Except as noted above the operation of this embodiment is similar to the operation of the first-described embodiment. It will be understood that the other parts of the engine are not illustrated in FIGURES 3 and 23 inasmuch as a disclosure of same is believed to be unnecessary.

Considering now the schematic diagrams of FIGURES 10-22, there is shown a portion of the cycle of the engine of the invention through 120° rotation. It is to be appreciated that an identical sequence is occuring at the opposite side of the engine.

The series begins in FIGURE 10 with the power-compression lobe about to eclipse the intake port through which the volume in front of the power-compression lobe has been filled by a combustible mixture by external means, not shown.

In FIGURES 11 and 12 it is seen that the longitudinal recess in the side plate is being uncovered at its forward end and filled with the compressed mixture. At this point in the cycle, since the intake port is completely eclipsed by the power-compression lobe, compression is beginning to occur, sealed by the tip seal of the apex of the power-compression lobe, and by the rolling line contact between the power wheel and the compression chamber wheel.

At FIGURE 13 there is shown the tip seal of the apex of the power-compression lobe about to enter at the trailing side of the combustion chamber, the longitudinal recess being uncovered at the forward end and receiving the compressed mixture.

Figure 14:
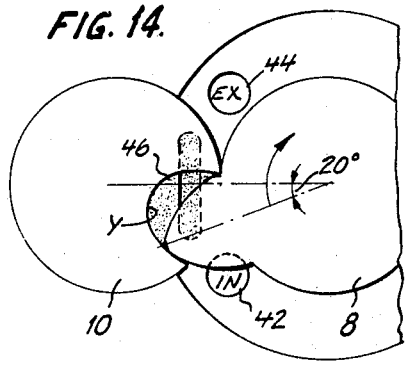
Figure 15:
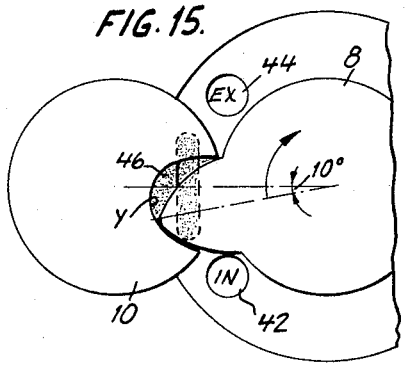

FIGURES 14 and 15 show the compression stroke continuing, sealed now by the tip seal at the apex of the power-compression lobe and the toe seal on the leading side of the compression chamber against the leading side of the power-combustion lobe.

Figure 16:
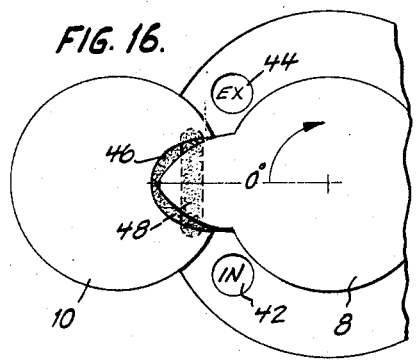

At FIGURE 16 is illustrated the position of the engine parts at 0° rotation, or "top dead center."

Compression is now at the mixamum value. Since the longitudinal recess in the side plate is now opened both to the volume ahead of the power-compression lobe (the compression zone) and the volume behind the power-compression lobe (the combustion zone) transfer of the compressed gas occurs through this recess and the total gas volume is sealed by the toe seals on the trailing and leading sides of the compression chamber against the trailing and leading sides of the power-compression lobe. In the event of transfer means around the tip seal of the apex of the power-compression lobe (FIGURES 3 and 23), at this point, or "top dead center," the transfer occurs through the recess or groove in the apex of the compression chamber or by other transfer means.

At an optimum degree of rotation, proximate to "top dead center," ignition occurs.

Figure 17:
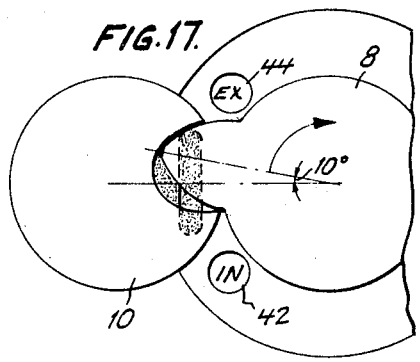
Figure 18:
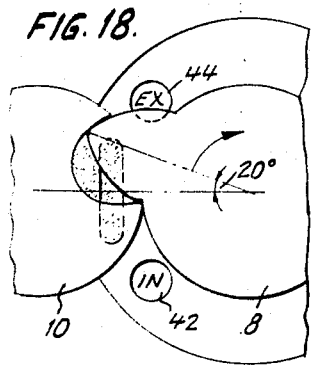
Figure 19:
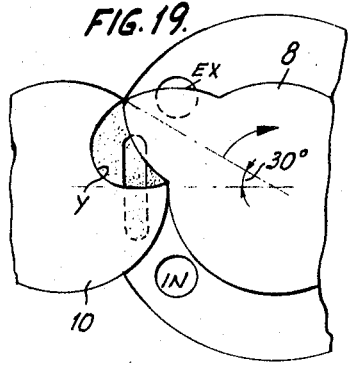
Figure 20:
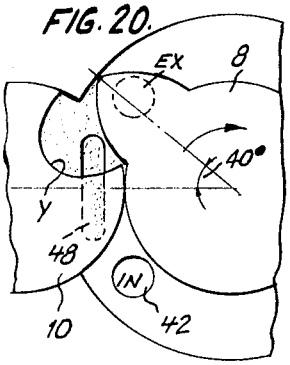
Figure 21:
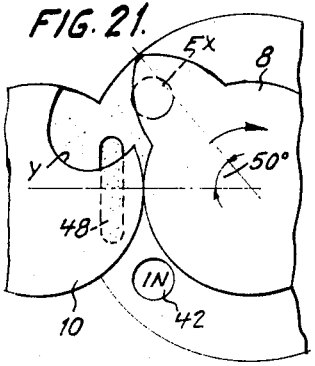

As shown in FIGURE 17 the forward end of the longitudinal recess is now eclipsed by the power-compression lobe and the recess is open only at the rear end. Combustion pressure is exerted against the power-compression lobe and is sealed by the tip seal at the apex of the lobe and the toe seal of the trailing side of the compression chamber against the trailing side of the power-compression lobe.

It is to be noted that the effective lever arm of the force exerted by the expanding gases on the lobe is much greater than the lever arm of the force exerted in the opposite direction against the trailing side of the compression chamber.

In FIGURES 18-21, there is illustrated the power stroke during which the combustion gases are expanding and continually exerting force against the power-compression lobe which is sealed by the tip seal at the apex of the lobe and the toe seal of the trailing side of the compression chamber against the trailing edge of the power-compression lobe.

Figure 22:
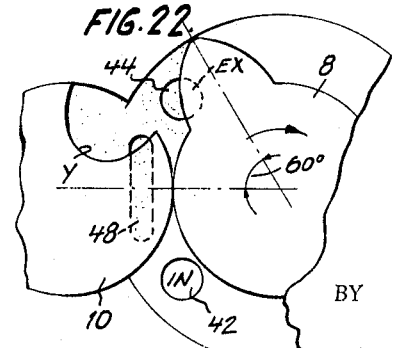

In FIGURE 22, the power-compression lobe is opening the exhaust port and the residual kinetic energy of the expanding gases is exhausting the combustion zone.

The above series of diagrams demonstrate the aforementioned advantages of the instant invention by illustrating the continual unidirectional nature of the intake, compression, power and exhaust portions of the engine cycle.

It is apparent that by changing the size and the location of the intake ports, variation in the swept volume are achieved. The extreme compression pressures that can thus be achieved, can be used for diesel operation of the engine by fuel injection at the proper time.

To summarize briefly, the invention relates to a novel rotary engine. The inventive concept discloses a rotary internal combustion engine which has many inherent advantages over the internal combustion engines presently available. The rotary internal combustion engine of this invention is of a design such that the kinetic energy of expanding gases exerts a continuous pressure against at least one power-compression lobe of a rotary member. The engine of the preferred embodiment of the invention contains but three moving parts, a power wheel and two compression chamber wheels, each synchronized with the other and rotating in fixed relation. The diametrically opposed lobes on the power wheel and the two opposed compression chambers in the compression chamber wheels are designed so as to coact with each other, compressing a combustible mixture and, after ignition, confining the energy of the expanding gases in a combustion zone so that their forces are exerted in a smooth continuous manner and translated into constant rotary motion.

Although particular preferred embodiments of the invention have been disclosed above in detail for illustrative purposes, it will be recognized that variations or modifications of such disclosure which lie within the scope of the appended claims are fully contemplated.

The embodiments of the invention in which an exclusive property or privilege is claimed are defined as follows:

1. In a rotary internal combustion engine, the combination comprising:
   a compression chamber rotor and a power compression rotor coupled for synchronous rotation, said power compression rotor having a lobe projecting therefrom, said lobe having a peripheral wall, said compression chamber rotor having a cavity having a base wall, said rotors being arranged so that as said rotors rotate, said lobe enters into and moves through said cavity,
   the base wall of said cavity having a shape defined in polar coordinates by the Equation I:

$$R = -A' + (A' + 2B) \cos \theta$$

where $\theta$ has values from (1) $\quad + \text{arc } \cos \left( \dfrac{B^2 + A'B + A'^2}{A'(A' + 2B)} \right)$ to (2) $\quad - \text{arc } \cos \left( \dfrac{B^2 + A'B + A'^2}{A'(A' + 2B)} \right)$ and $A'$ = the diameter of the compression chamber rotor
   $B$ = the depth of the cavity
   the peripheral wall of said lobe having a leading side and a trailing side which are joined at an apex, the shape of the entire leading side of said lobe being defined in polar coordinates by the Equation II:

$$R = 2A(1 - \cos \theta$$

where $\theta$ has values from 0° to $$\text{Arc } \cos \dfrac{(A+B)^2 - 5A^2}{-4A^2}$$

and $A$ = the radius of the power compression rotor
   $B$ = the maximum radial dimension of the lobe;
   the shape of the portions of the trailing side of the lobe adjacent the apex and adjacent the position at which the trailing side merges with the peripheral wall of said power compression rotor also being defined by Equation II and the remainder of said trailing side lying on or within the curve defined by Equation II;
   said lobe and cavity thereby being shaped so that the peripheral wall of said lobe as it moves through said cavity is in substantial sealing relationship with the base wall of said cavity adjacent the leading and trailing ends thereof and at the apex thereof whereby a sealed compression zone is formed between said apex and said leading end and a sealed combustion zone is formed between said apex and said trailing end;
   transfer passage means for transferring compressed combustible fluid to said combustion zone after said lobe has moved a selected distance through said cavity; and
   means for igniting the combustible fluid in the combustion zone.

2. A rotary internal combustion engine according to claim 1, in which said compression chamber rotor includes a rigid central portion and toe seals movably mounted on said central portion at the opposite ends of said cavities, said toe seals each having an arcuate wall forming an extension of the base wall of said cavity, and resilient means for normally urging said toe seals inwardly into selected positions for sealingly contacting said lobe, said toe seals being movable with respect to said compression chamber rotor in an outward direction in response to pressure applied thereon by said lobe.

3. A rotary internal combustion engine according to claim 1, in which said power compression rotor, has a plurality of power lobes projecting therefrom;
   a plurality of compression chamber rotors disposed in association with the power compression rotor, each compression chamber rotor having a plurality of oppositely disposed cavities therein adapted to receive the lobes to compress a combustible fluid and confine same during combustion thereof, the power compression rotor and the compression chamber rotor being coupled together for synchronous rotation.

4. A rotary internal combustion engine according to claim 3, in which said rotors are disposed within a casing having head member means disposed in substantial sealing relationship with the axial ends of said rotors, said transfer passage means comprising passage means in said head member means adapted to communicate with said compression zones, said lobes each being movable across said transfer passage means to block communication thereof with said combustion zone until said lobe has moved a selected distance through said cavity.

5. A rotary internal combustion engine according to claim 3, in which the transfer passage means comprise passage means formed in the base wall of each cavity and extending from the leading side thereof toward the trailing side thereof so that communication between said zones will be established when the tip of said lobe approaches the leading side of the cavity.

6. A rotary internal combustion engine according to claim 5, in which each compression chamber rotor has a pair of internal passages communicating at one end thereof with the respective cavities and the other ends thereof extending through the opposite axial ends of said compression chamber rotor and web means separating said passages from each other.

7. A rotary internal combustion engine according to claim 6, including a pair of spark plugs mounted on each compression chamber rotor, each spark plug being associated with one of said passages.

8. A rotary internal combustion engine according to claim 7, in which end plates are secured to opposite axial sides of each compression chamber rotor for rotation therewith, said spark plugs being mounted on said end plates.

9. In a rotary internal combustion engine, the combination comprising:
   a plurality of rotatable members coupled for synchronous rotation, one of said members having a lobe having a peripheral wall, a second of said members having a recess having a base wall, said members being arranged so that as said members rotate said lobe enters into and moves through said recess, said lobe and said recess being shaped so that the peripheral wall of said lobe as it moves through said recess is in substantial sealing relationship with the base wall of said recess adjacent the leading and trailing ends thereof and at a position spaced from and located between said ends whereby a sealed compression zone is formed between said position and said leading end and a sealed combustion zone is formed between said position and said trailing end;
   seal members having arcuate walls extending beyond the ends of and forming extensions of said base wall of said recess at the leading and trailing ends thereof and means mounting said seal members on said second member and resiliently biasing said seal members to an inwardly extended position for sealingly contacting said lobe, said seal members being movable with respect to said second member in an outward direction in response to pressure applied thereon by said lobe;

transfer passage means for transferring compressed combustible fluid to said combustion zone after said lobe has moved a selected distance through said recess; and means for igniting the combustible fluid in the combustion zone.

10. A rotary internal combustion engine according to claim 9, in which said transfer passage means extends from adjacent the seal member at the leading end of said recess transversely across said recess to a position past the top dead center position of said lobe in said recess to place the compression zone in communication with the combustion zone when the lobe has moved to its top dead center position in said recess.

11. In a rotary internal combustion engine, the combination comprising:

a plurality of rotatable members coupled for synchronous rotation, one of said members having a lobe having a peripheral wall, another of said members having a recess having a base wall, said members being arranged so that as said members rotate said lobe enters into and moves through said recess, said lobe and recess being shaped so that the peripheral wall of said lobe as it moves through said recess is in substantial sealing relationship with the base wall of said recess adjacent the leading and trailing ends thereof and at a position spaced from and located between said ends whereby a sealed compression zone is formed between said position and said leading end and a sealed combustion zone is formed between said position and said trailing end;

axial end walls associated with said recess for closing the opposite axial ends thereof;

said lobe having axial end walls adapted to be disposed in substantial sealing relationship with said axial end walls of said recess;

transfer passage mean formed in at least one of said axial end walls and extending transversely across said recess between said compression zone and said combustion zone for transferring compressed combustible fluid from said compression zone to said combustion zone after said lobe has moved a selected distance through said recess; and means for igniting the combustible fluid in the combustion zone.

12. In a rotary internal combustion engine, the combination comprising:

a plurality of rotatable members coupled for synchronous rotation, one of said members having a lobe having a peripheral wall, another of said members having a recess having a base wall, said members being arranged so that as said members rotate said lobe enters into and moves through said recess, said lobe and recess being shaped so that the peripheral wall of said lobe as it moves through said recess is in substantial sealing relationship with the base wall of said recess adjacent the leading and trailing ends thereof and at a position spaced from and located between said ends whereby a sealed compression zone is formed between said position and said leading end and a sealed combustion zone is formed between said position and said trailing end;

transfer passage means formed between said base wall of said recess and said peripheral wall of said lobe and extending from adjacent the leading end of said recess to a position immediately past the top dead center position of said lobe in said recess for transferring compressed combustible fluid from said compression zone to said combustion zone after said lobe has moved to said top dead center position with said recess; and means for igniting the combustible fluid in the combustion zone.

References Cited

UNITED STATES PATENTS 3,060,911 10/1962 Milton _____ 123—13
2,275,205 3/1942 Straub _____ 123—13

FOREIGN PATENTS 1,294,417 4/1962 France.

JULIUS E. WEST, *Primary Examiner.*